US008118545B2

(12) United States Patent  
Chapman et al.

(10) Patent No.: US 8,118,545 B2  
(45) Date of Patent: Feb. 21, 2012

(54) VARIABLE GEOMETRY TURBOCHARGER

(75) Inventors: Kirby Chapman, Manhattan, KS (US); Ueli Honnegger, Zurich (CH)

(73) Assignee: Kansas State University Research Foundation, Manhattan, KS (US)

( * ) Notice: Subject to any disclaimer, the term of this patent is extended or adjusted under 35 U.S.C. 154(b) by 723 days.

(21) Appl. No.: 12/243,816

(22) Filed: Oct. 1, 2008

(65) Prior Publication Data

US 2010/0080694 A1  Apr. 1, 2010

(51) Int. Cl.  
*F01D 17/16* (2006.01)  
*F01D 25/08* (2006.01)

(52) U.S. Cl. ........................................ 415/166; 415/151

(58) Field of Classification Search ................. 415/151, 415/159, 164, 165, 166, 126, 127, 204, 208.3, 415/416; 60/46, 140  
See application file for complete search history.

(56) References Cited

U.S. PATENT DOCUMENTS

| | | | | |
|---|---|---|---|---|
| 2,341,974 | A * | 2/1944 | Browne | 415/26 |
| 4,643,640 | A * | 2/1987 | Burdette et al. | 415/164 |
| 5,207,559 | A * | 5/1993 | Clevenger et al. | 415/166 |
| 7,186,077 | B2 * | 3/2007 | Daudel et al. | 415/164 |
| 7,497,654 | B2 * | 3/2009 | Lavez et al. | 415/1 |
| 2002/0119042 | A1 * | 8/2002 | Yoshimura et al. | 415/164 |
| 2005/0123394 | A1 * | 6/2005 | McArdle et al. | 415/164 |
| 2008/0075582 | A1 * | 3/2008 | Sausse et al. | 415/159 |

FOREIGN PATENT DOCUMENTS

EP    226444 A2 *  6/1987

OTHER PUBLICATIONS

U.S. Appl. No. 12/243,833, filed Oct. 1, 2008, entitled Turbocharager Booster System; Inventors: Kirby Chapman, et al.  
U.S. Appl. No. 12/570,710, filed Sep. 30, 2009, entitled Active Air Control; Inventors: Kirby S. Chapman, et al.  
Kansas State University—National Gas Machinery Laboratory Article entitled "Development of a Turbocharger Booster System", Published Oct. 3, 2007 and written by Kirby S. Chapman, Ph.D., et al. (17 pages).  
Kansas State University—National Gas Machinery Laboratory Slide Show entitled "Development of a Turbocharger Boosting System", Published Oct. 3, 2007 and written by Kirby S. Chapman, Ph.D. et al. (25 pages).

(Continued)

*Primary Examiner* — Benjamin Sandvik  
*Assistant Examiner* — Joseph Schoenholtz  
(74) *Attorney, Agent, or Firm* — Hovey Williams LLP

(57) ABSTRACT

A turbocharged engine includes an internal combustion engine and a variable geometry turbocharger. The turbocharger is adjustable to operate efficiently under various engine operating and environmental conditions. The turbocharger includes a turbine and compressor, with the compressor including a compressor housing, an impeller rotatably mounted in the housing, and an adjustable diffuser vane assembly. The diffuser vane assembly includes a plurality of pivotal diffuser vanes spaced about the impeller and a vane rotation drive that interconnects the vanes and permits simultaneous adjustment of the diffuser vanes to improve the efficiency and operating range of the turbocharger. The diffuser vane assembly also includes a vane locking drive operable to engage the pivotal vanes and prevent vane movement during turbocharger operation.

34 Claims, 12 Drawing Sheets

OTHER PUBLICATIONS

Kansas State University Article entitled "Development of the Charge Air Integrated Manifold Engine Numerical Simulation (CAIMENS) for Active Air Control System Implementation" Published Oct. 1, 2007 and written by Diana K. Grauer, B.S.M.E. et al. (17 pages).

Kansas State University Slide Show entitled "Development of the Charge Air Integrated Manifold Engine Numerical Simulation (CAIMENS) for Active Air Control System Implementation" Published Oct. 3, 2007 and written by Diana K. Grauer, B.S.M.E. et al.

* cited by examiner

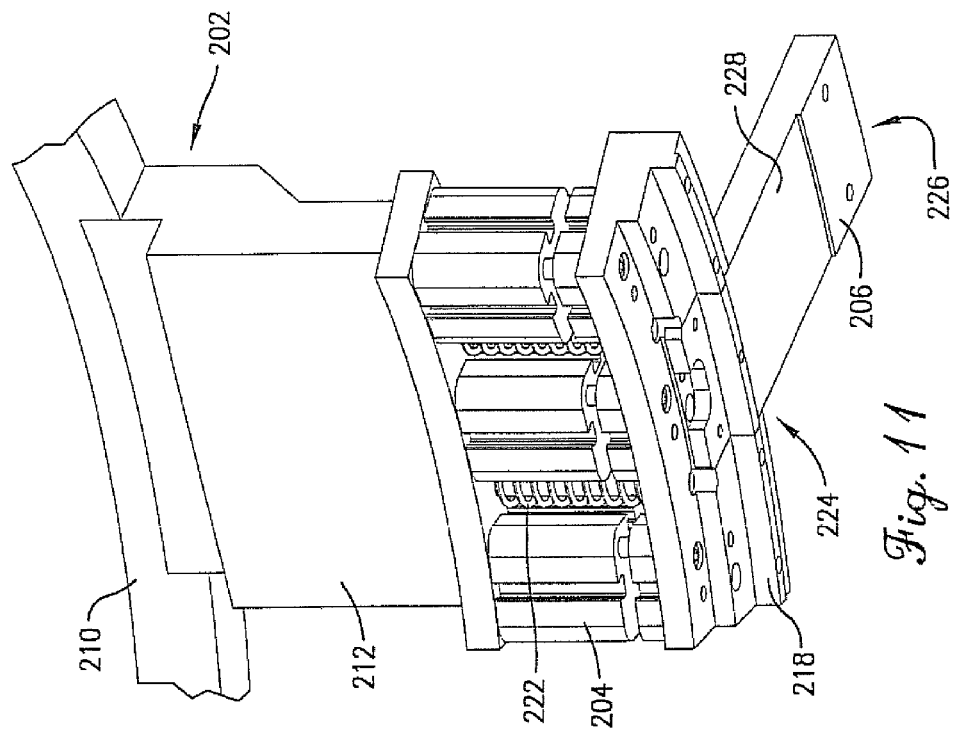
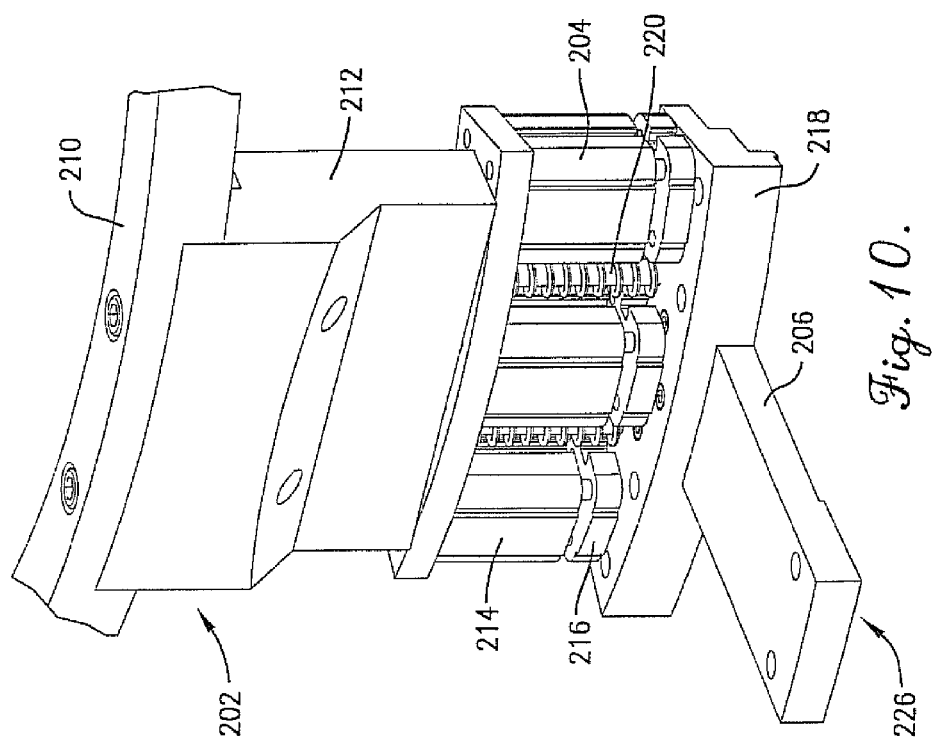

VARIABLE GEOMETRY TURBOCHARGER

CROSS REFERENCE TO RELATED APPLICATION

This application is being filed contemporaneously with application for U.S. Pat. Ser. No. 12/243,833, entitled TURBOCHARGER BOOSTER SYSTEM, and application for U.S. Letters Patent Ser. No. 61/101,957, entitled ACTIVE AIR CONTROL, both of which are hereby incorporated in their entirety by reference herein.

BACKGROUND

1. Field

The present invention relates generally to turbochargers. More specifically, embodiments of the present invention concern a variable geometry turbocharger with adjustable vanes.

2. Discussion of Prior Art

Turbochargers are commonly used to improve the performance of reciprocating internal combustion engines. Prior art turbochargers include a turbine, which is powered by energy available from engine exhaust, and a compressor driven by the turbine to provide a compressed charge of intake air to the engine. It is well known for turbochargers to have operating characteristics matched with a corresponding engine so that efficient turbocharger operation occurs over a range of engine load or engine speed. For instance, the turbine or compressor of the turbocharger can be sized for a particular engine. Also, turbochargers often employ a wastegate to vent exhaust air or intake air. Furthermore, it is known for a turbocharger to have features with variable geometry so that the turbocharger operating characteristic is adjustable.

While the prior art features permit turbocharger matching, prior art turbochargers suffer from various limitations. For instance, prior art variable geometry turbochargers are generally unreliable and prone to mechanical failure. Furthermore, prior art turbochargers include compressors that have a narrow operating range between surge and choke conditions, particularly under off-design operating conditions. The prior art turbochargers also fail to operate at peak efficiency over a range of engine load or engine speed.

SUMMARY

Embodiments of the present invention provide a variable geometry turbocharger that does not suffer from the problems and limitations of the prior art turbochargers set forth above.

A first embodiment of the present invention concerns a variable geometry turbocharger configured to provide compressed air flow. The variable geometry turbocharger broadly includes a turbocharger, a rotatable impeller, and an adjustable diffuser vane assembly. The turbocharger housing presents a compressor chamber with an inlet and a diffuser. The rotatable impeller is positioned in the compressor chamber. The adjustable diffuser vane assembly includes a plurality of diffuser vanes positioned in the diffuser and circumferentially spaced about the impeller. The diffuser vanes are pivotal relative to the impeller to define an adjustable vane angle relative to the impeller. The adjustable diffuser vane assembly includes a vane-locking drive operably coupled to the diffuser vanes. The vane-locking drive is shiftable into and out of a locked configuration in which the vane-locking drive holds the diffuser vanes to restrict vane angle adjustment.

A second embodiment of the present invention concerns a variable geometry turbocharger configured to provide compressed air flow. The variable geometry turbocharger broadly includes a turbocharger housing, a rotatable impeller, and an adjustable diffuser vane assembly. The turbocharger housing presents a compressor chamber with an inlet and a diffuser. The rotatable impeller is positioned in the compressor chamber. The adjustable diffuser vane assembly includes a plurality of diffuser vanes positioned in the diffuser and circumferentially spaced about the impeller. The diffuser vanes are pivotal relative to the impeller to define an adjustable vane angle relative to the impeller. The adjustable diffuser vane assembly includes a rotating drive ring supported by at least one of the housing sections. The drive ring is attached relative to the diffuser vanes and configured to adjust the vane angle of the diffuser vanes.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein.

Figure 4:
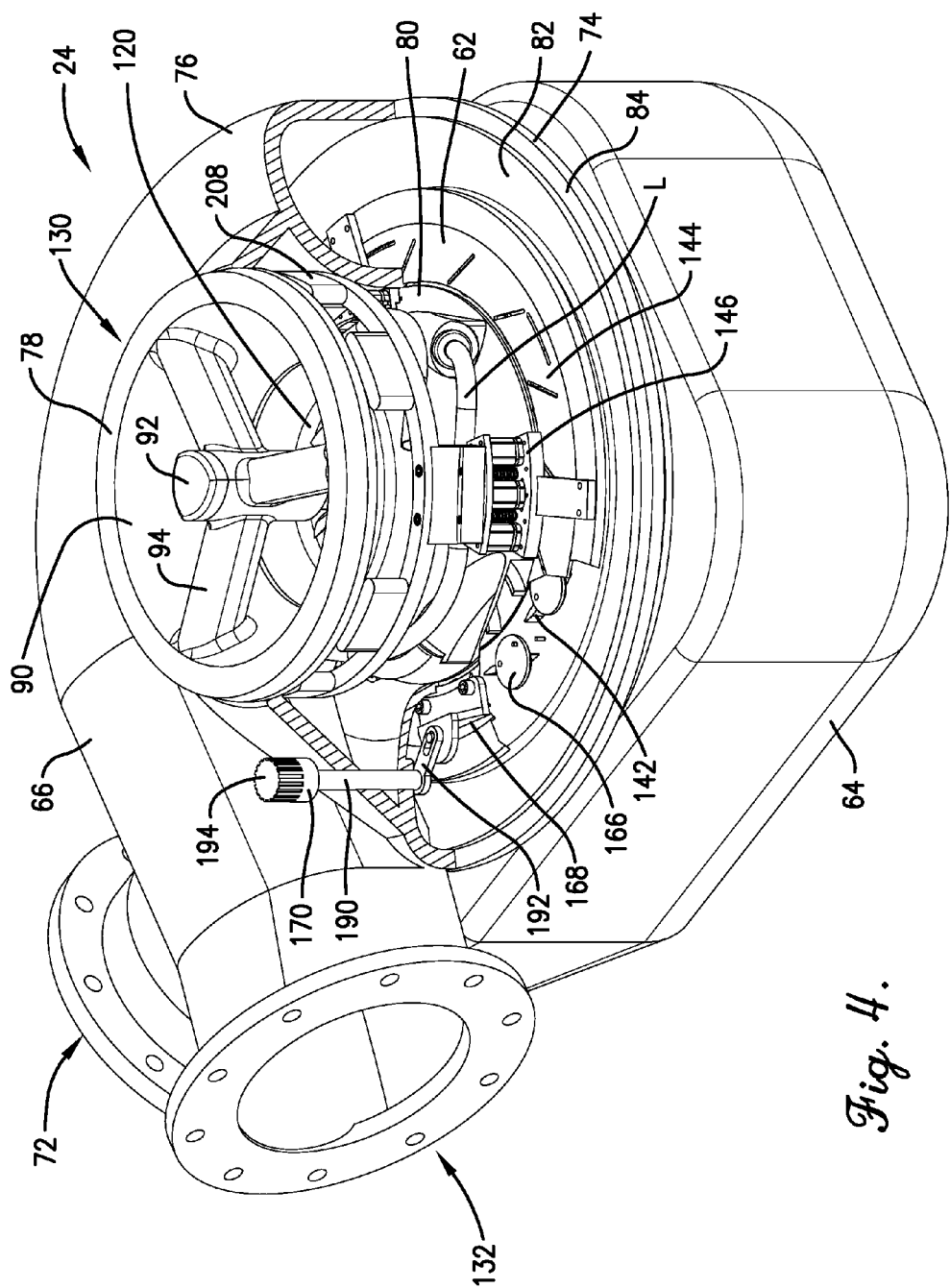
FIG. 4 is a perspective of the turbocharger shown in FIGS. 1-3, showing a compressor housing and an adjustable diffuser vane assembly of the compressor, with part of a scroll section of the compressor housing removed and part of a vane rotation drive of the adjustable diffuser vane assembly removed.
Figure 5:
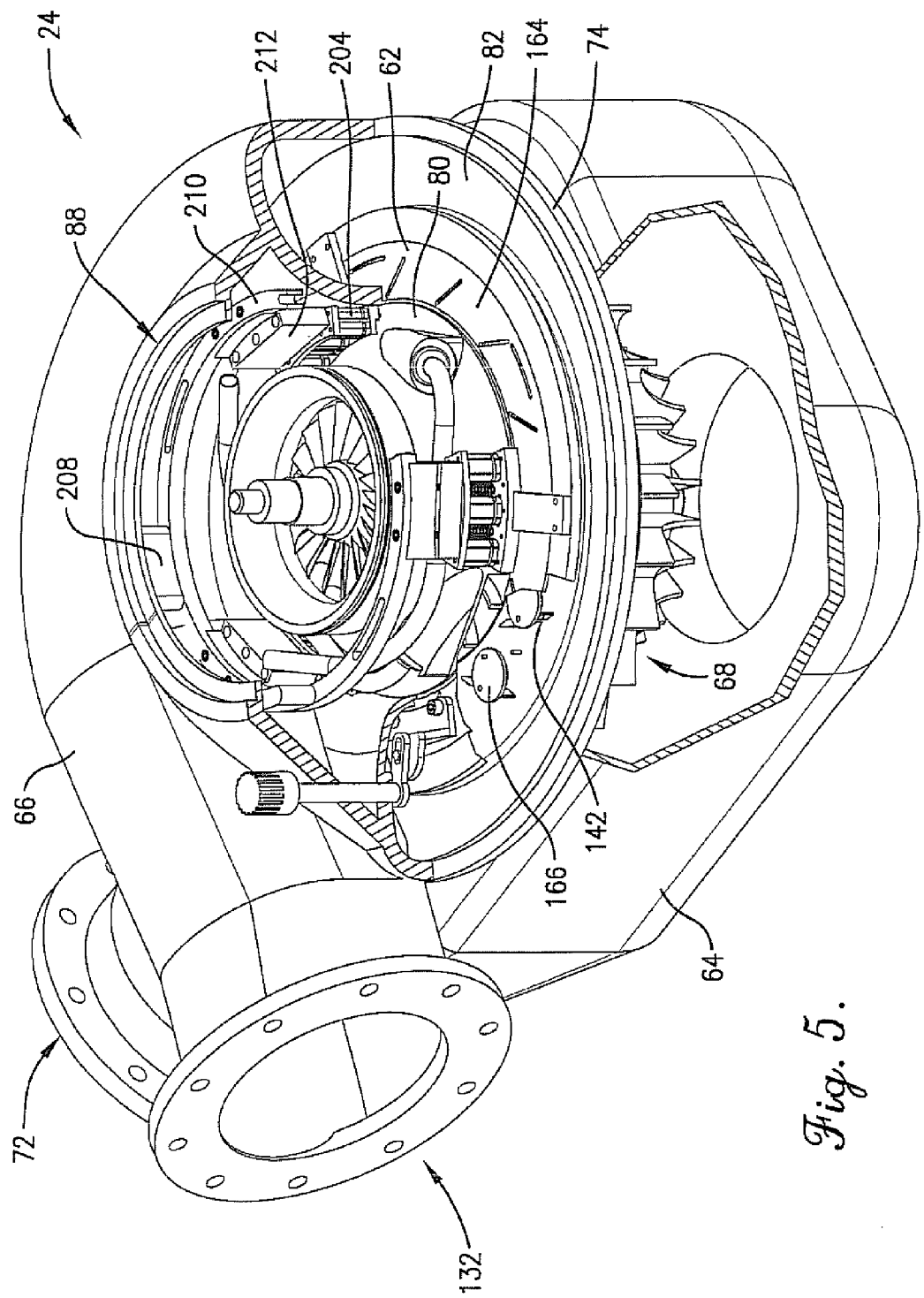
FIG. 5 is a perspective of the turbocharger shown in FIGS. 1-4, showing part of the turbine housing of the turbocharger turbine removed to show a rotor of the turbine, and also showing an inlet section of the compressor housing removed to further show a vane locking drive of the adjustable diffuser vane assembly and the compressor impeller.
Figure 6:
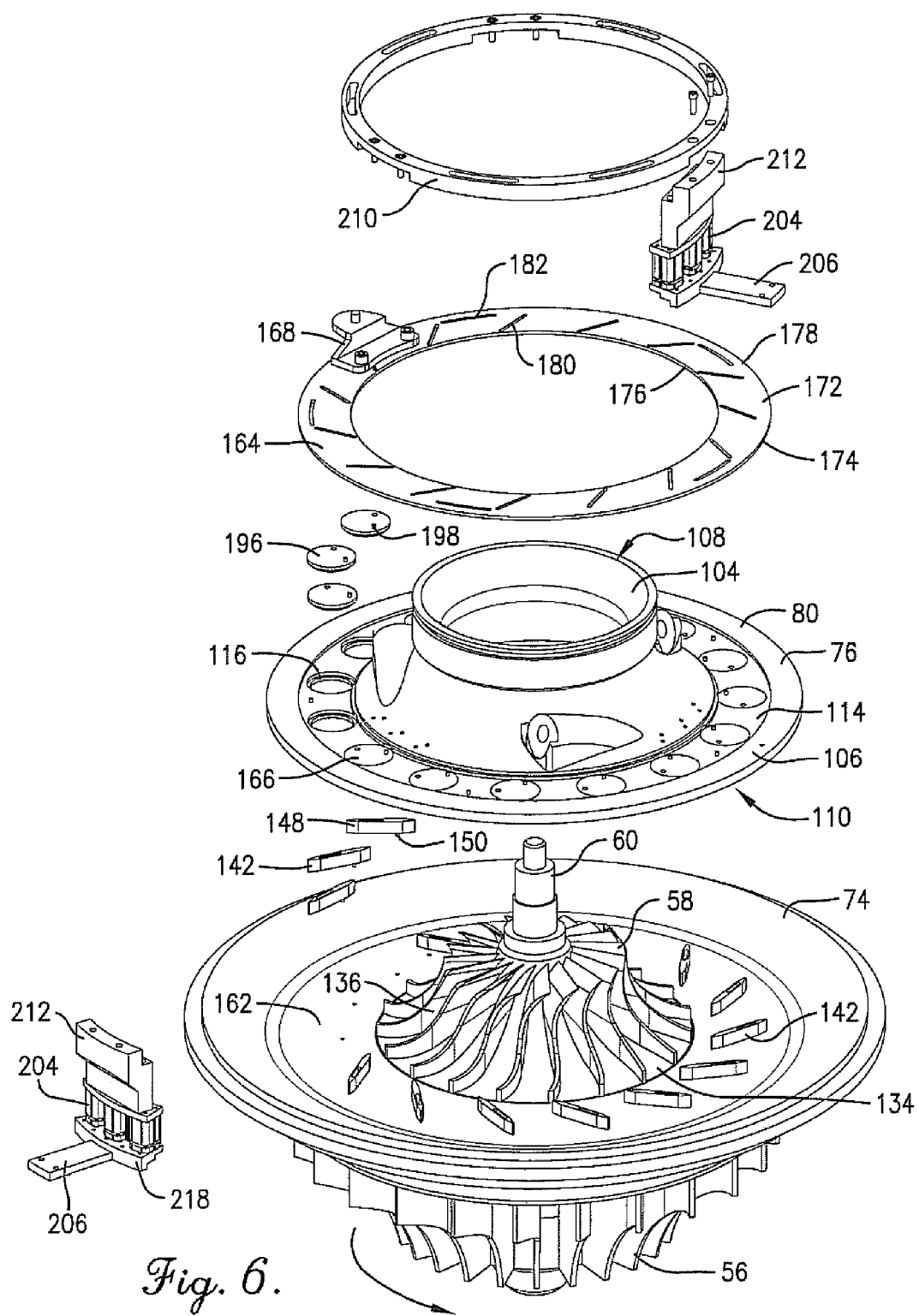
FIG. 6 is a fragmentary exploded view of the turbocharger shown in FIGS. 1-5, showing the adjustable diffuser vane assembly exploded from an intermediate section of the compressor housing, and further showing a shroud section of the compressor housing exploded from the intermediate section to show the impeller.
Figure 7:
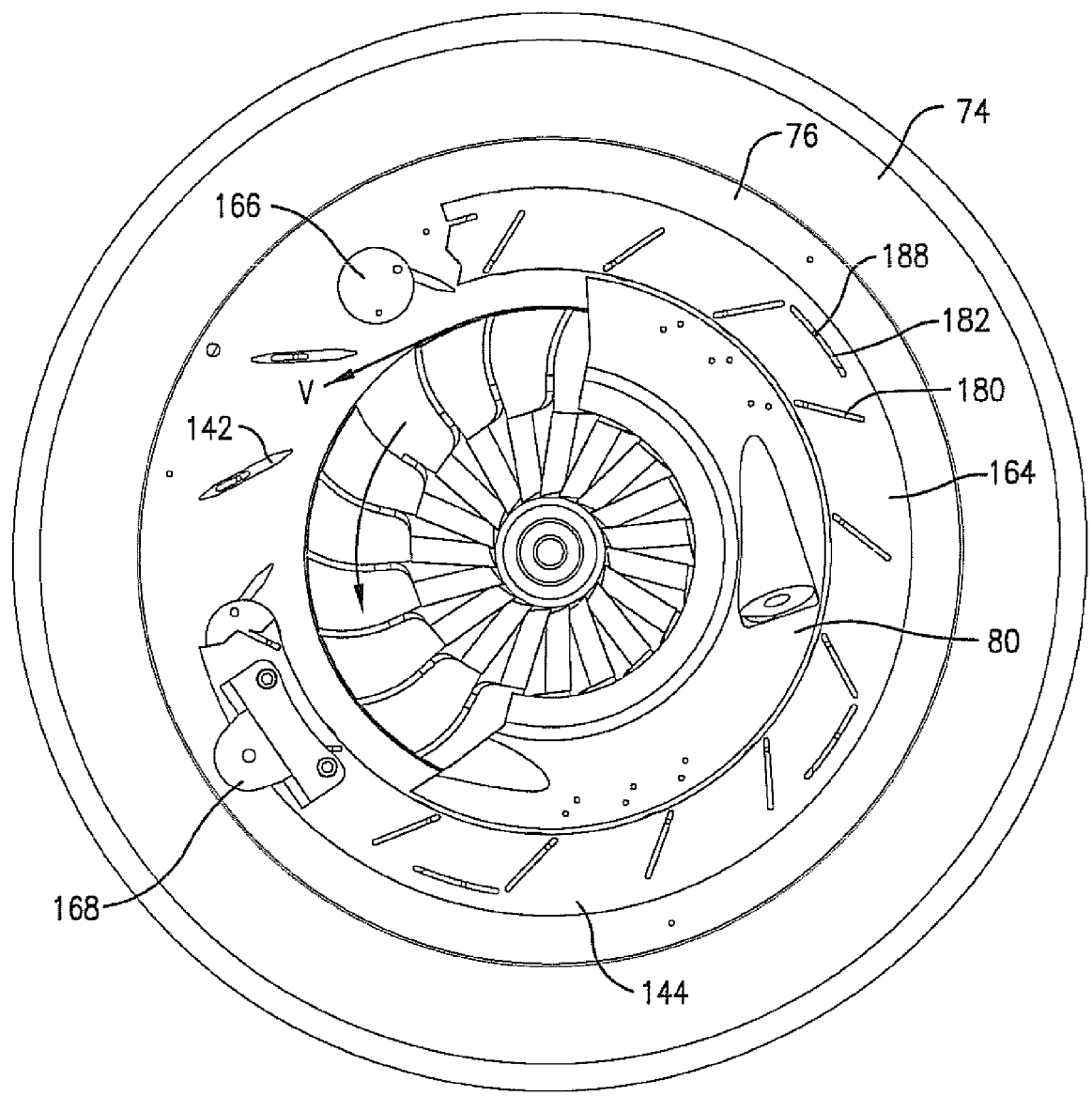
FIG. 7 is a fragmentary front elevation of the turbocharger shown in FIGS. 1-6, showing the scroll section removed to show the intermediate and shroud sections, and also showing part of a drive ring of the adjustable diffuser vane assembly removed to show cam discs and pivotal diffuser vanes, with the diffuser vanes in an open diffuser throat position.
Figure 12:
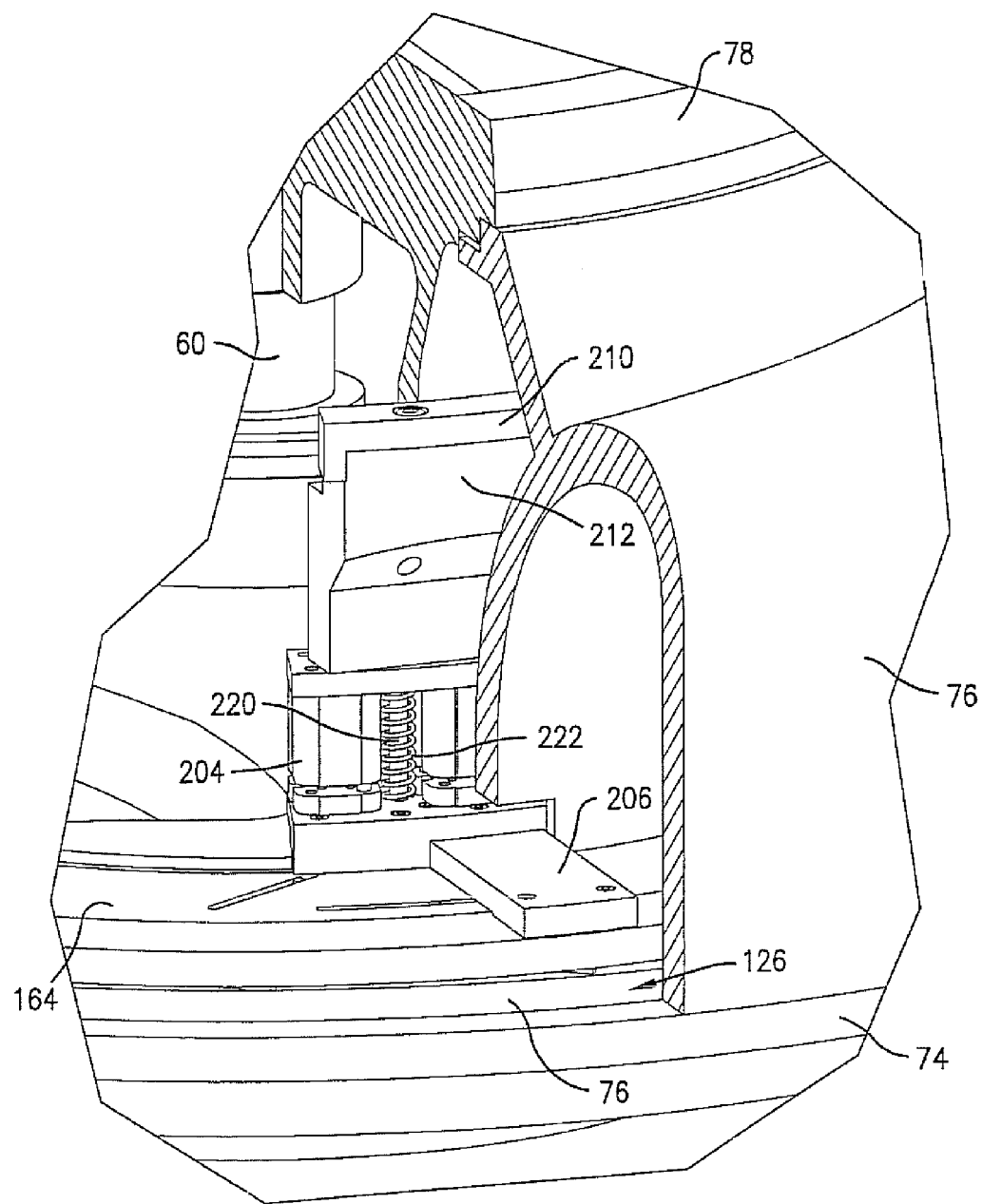
Figure 13:
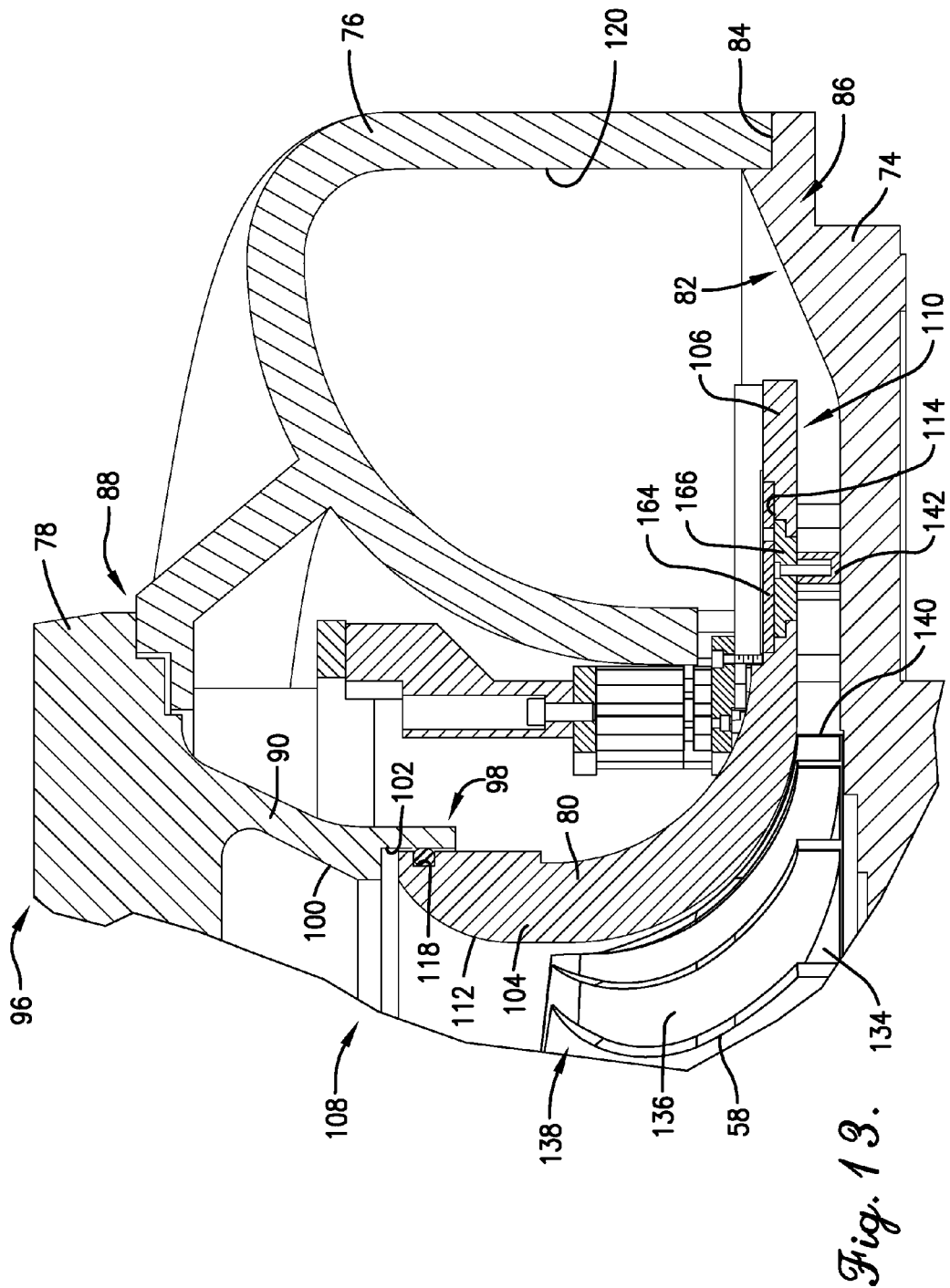
Figure 14:
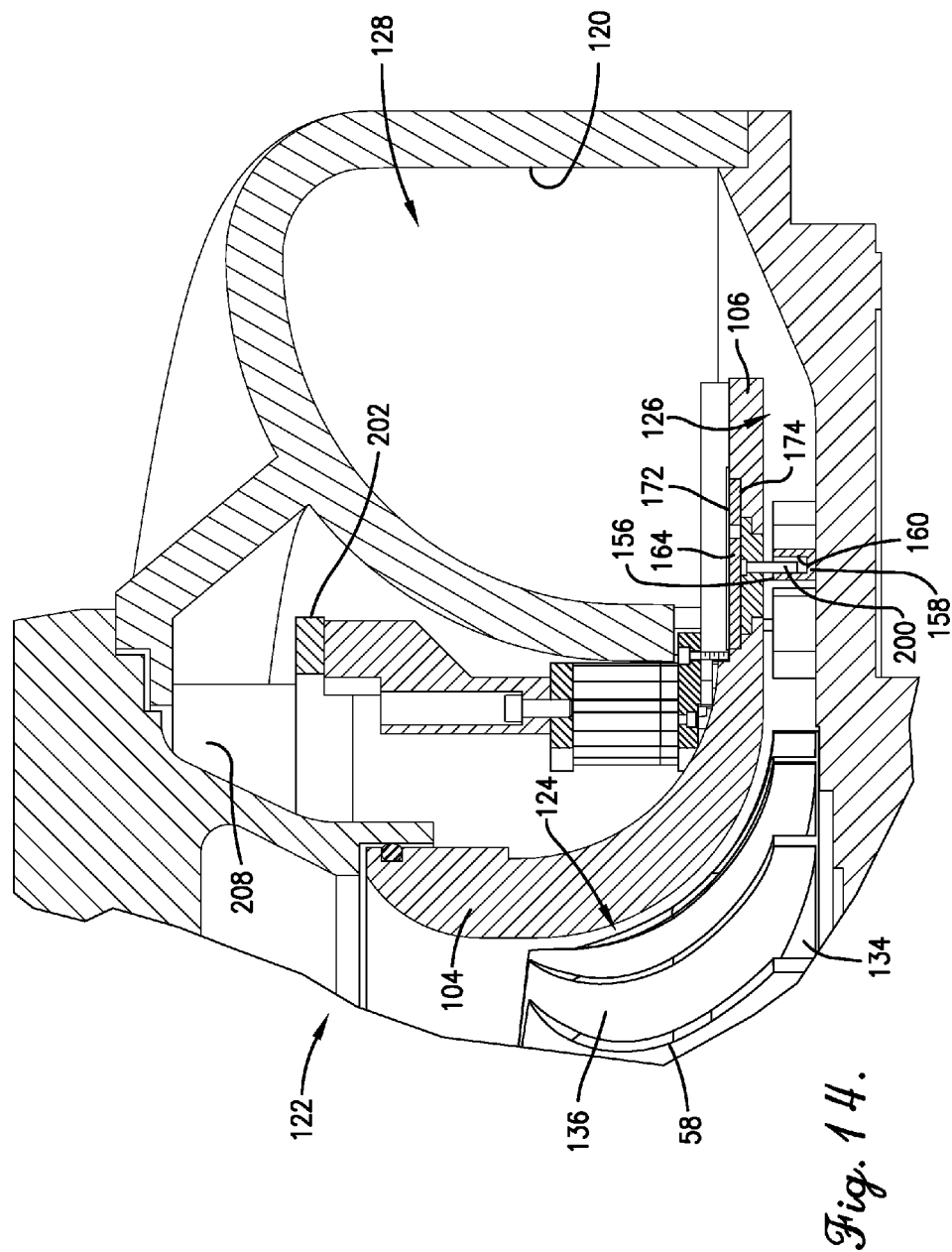

FIG. 10 is a fragmentary front perspective of the vane locking drive shown in FIGS. 4-6, showing a ring-shaped bracket and cylinder mount shiftably attached to an arm mount and compression arm by three pneumatic cylinders to cooperatively provide the vane locking drive, with a pair of spring-loaded rods slidably interconnecting the cylinder mount and arm mount, and showing pistons of the pneumatic cylinders in an extended position;

FIG. 11 is a fragmentary rear perspective of the vane locking drive shown in FIG. 10;

FIG. 12 is a fragmentary perspective of the turbocharger shown in FIGS. 1-7, showing the cylinders of the vane locking drive extended so that the vane locking drive is in a locked condition to thereby compress and frictionally engage the diffuser vanes;

FIG. 13 is a fragmentary cross-section of the turbocharger shown in FIGS. 1-7 and 12, showing the vane locking drive in the locked condition; and FIG. 14 is a fragmentary cross-section of the turbocharger shown in FIGS. 1-7, 12, and 13, showing the cylinders retracted so that the vane locking drive is in an unlocked condition to permit pivotal movement of the diffuser vanes.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Figure 1:
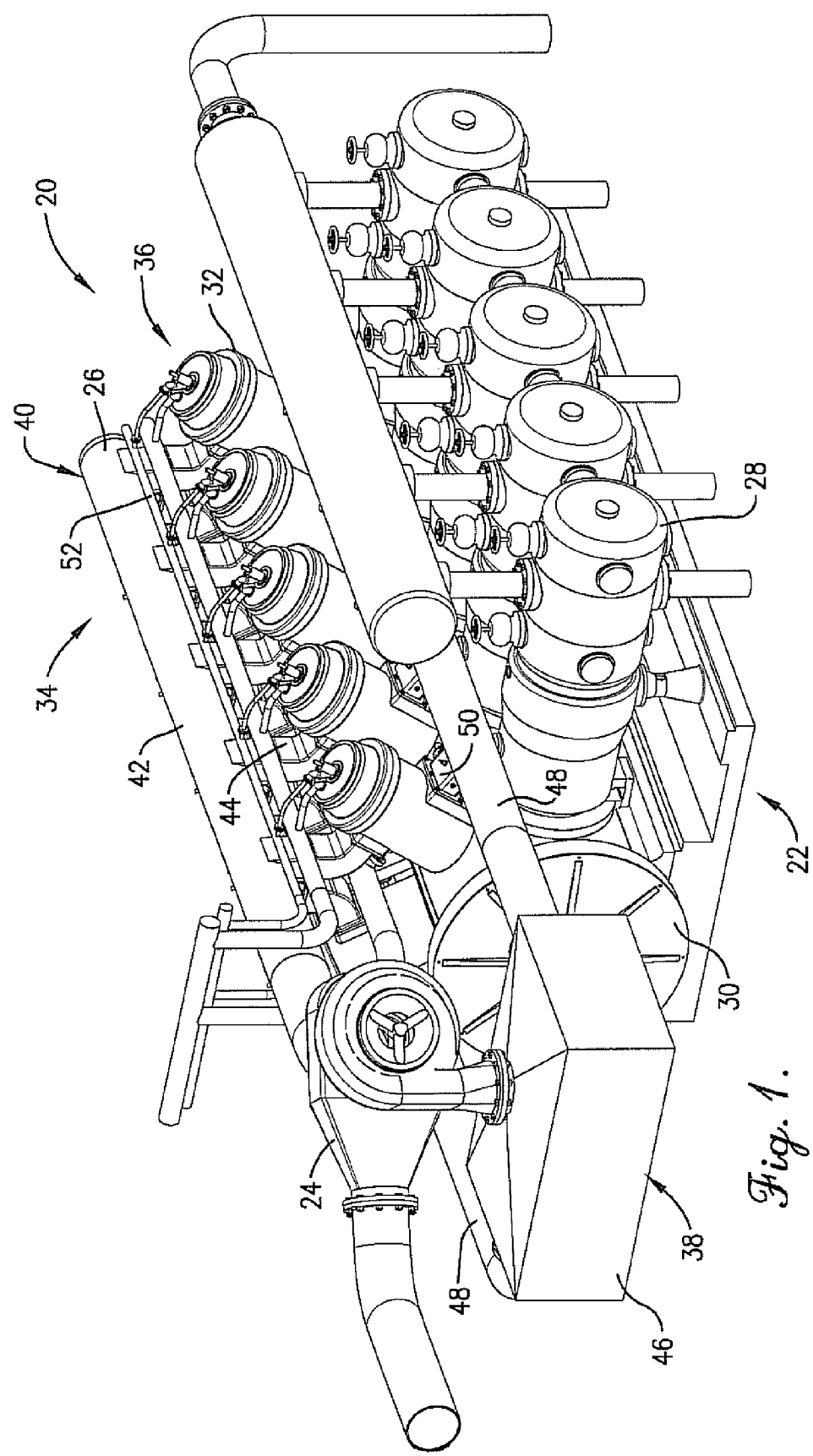
FIG. 1 is a perspective of a turbocharged engine constructed in accordance with a preferred embodiment of the present invention, with the turbocharged engine including a integral compressor-engine and a turbocharger.
Figure 2:
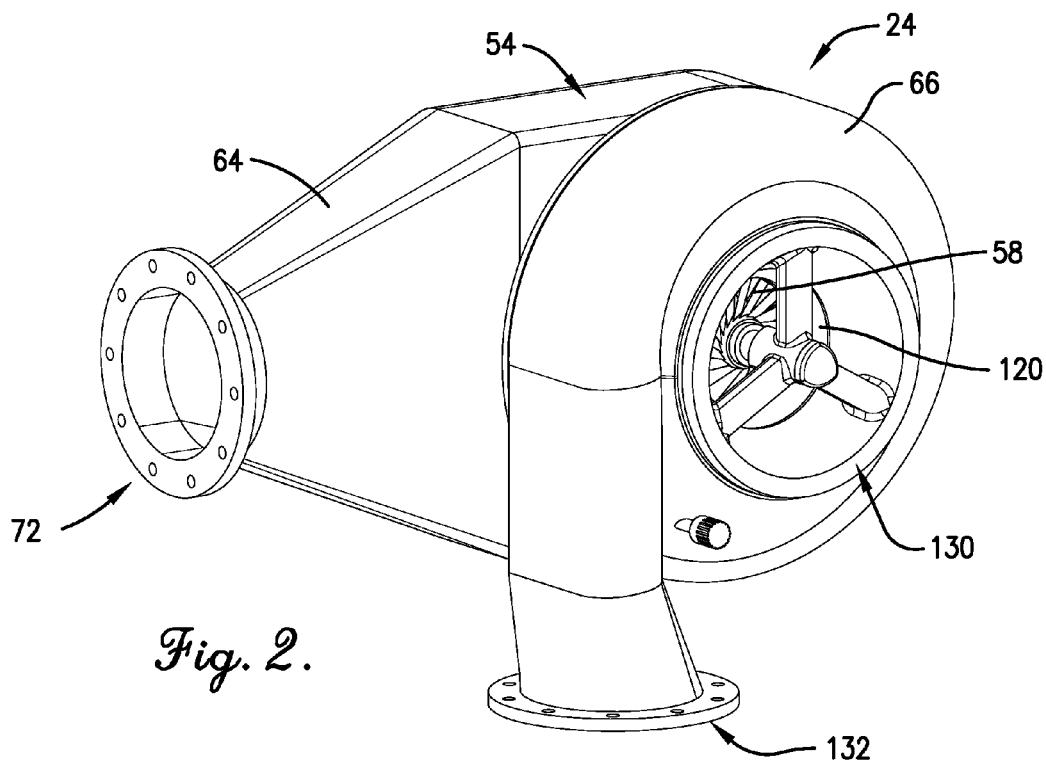
FIG. 2 is a front perspective of the turbocharger shown in FIG. 1, showing a compressor housing and impeller that cooperatively provide a compressor of the turbocharger.
Figure 3:
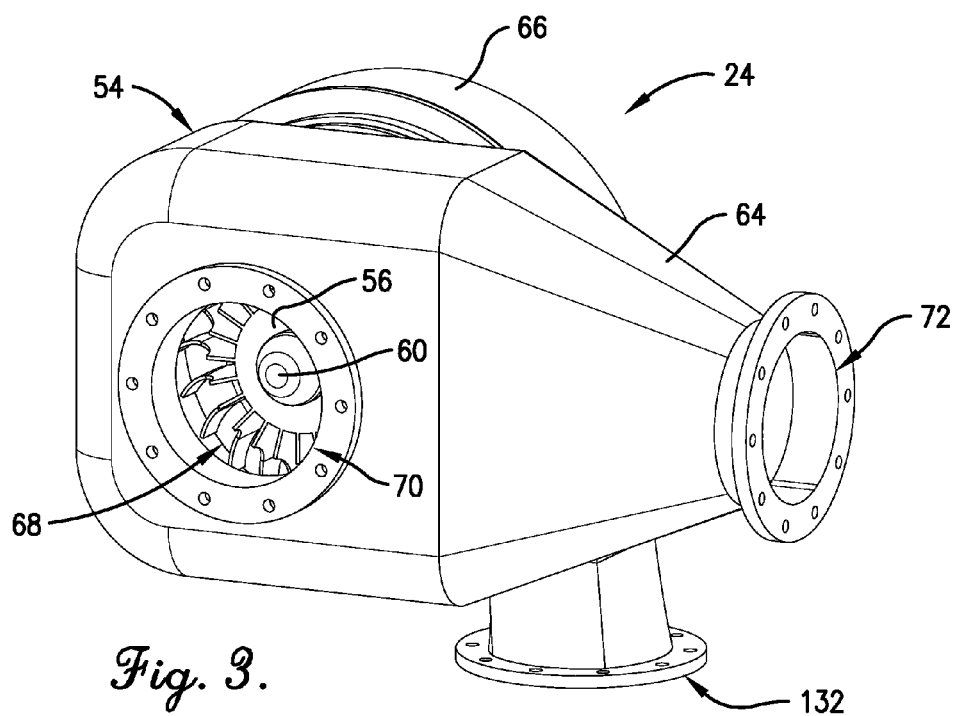
FIG. 3 is a rear perspective of the turbocharger shown in FIGS. 1 and 2, showing a turbine housing and rotor that cooperatively provide a turbine of the turbocharger.

Turning initially to FIG. 1, a turbocharged engine 20 is operable to compress and transmit natural gas along a natural gas transmission line (not shown). The turbocharged engine 20 is particularly suited to operate efficiently while producing a minimal amount of harmful gas emissions, such as $NO_X$ emissions, from engine operation. The illustrated turbocharged engine 20 is preferably used for gas transmission, but the principles of the present invention are applicable for other internal combustion engine applications, such as marine power, electricity generation, construction equipment, over-the-road vehicles, and other industrial power applications, that require an efficient and low-emission internal combustion engine. The turbocharged engine 20 broadly includes an integral gas engine-compressor 22 and a turbocharger assembly 24.

The integral gas engine-compressor 22 is fluidly coupled to the natural gas transmission line to compress and transmit natural gas. The illustrated integral gas engine-compressor 22 broadly includes a reciprocating two-stroke internal combustion engine 26 and a gas compressor assembly 28. The illustrated engine-compressor 22 is a Cooper GMV integral engine, but could be another type of integral gas engine-compressor. Also, it is within the ambit of the present invention where the engine-compressor 22 comprises a reciprocating engine without a gas compressor. Furthermore, the principles of the present invention are equally applicable to four-stroke engines as well as the illustrated two-stroke internal combustion engine 26.

The internal combustion engine 26 is a conventional large-bore engine, i.e, an engine much larger than a conventional automotive engine, and serves to power the gas compressor assembly 28. The engine 26 includes a crankcase 30 and cylinder heads 32 mounted on the crankcase 30 to provide a left side cylinder bank 34 and a right side cylinder bank 36, both with multiple cylinders spaced along the engine axis. In the usual manner, each cylinder has intake and exhaust ports (not shown).

The engine-compressor 22 also includes an intake assembly 38 and an exhaust assembly 40 that fluidly communicate with the intake and exhaust ports. The exhaust assembly 40 includes an exhaust manifold 42 that extends along the engine axis between the cylinder banks 34,36. In the usual manner, the exhaust manifold 42 is fluidly connected to the exhaust ports by exhaust runners 44 so that exhaust oases flow out of the cylinders, through respective exhaust runners 44, and then through the exhaust manifold 42.

The intake assembly 38 includes a plenum 46, a pair of intake manifolds 48 fluidly connected to the plenum 46 at manifold inlets, and a plurality of intake runners 50. The intake runners 50 fluidly connect the intake manifolds 48 and the intake ports, with intake air being configured to flow from the plenum 46, flow downstream through the intake manifolds 48, and then into the cylinders by passing through respective intake runners 50. The intake assembly 38 further includes air balancing valves (not shown) installed in the intake runners 50 and configured to control air flow into respective intake ports.

Intake air from the intake assembly 38 and fuel from a gas fuel system 52 of the engine 26 are combined in the engine cylinders to support combustion, with the air flow rate, the fuel flow rate, and the scavenging efficiency of each cylinder providing a trapped equivalence ratio $\phi$. The trapped equivalence ratio $\phi$ is the ratio of the actual fuel-to-air ratio in the cylinder to the stoichiometric fuel-to-air ratio. Importantly, it has been determined that $NO_X$ production is a function of trapped equivalence ratio $\phi$, and the intake assembly 38 is configured to substantially balance air flow among cylinders and is configured to substantially equalize the trapped equivalence ratio $\phi$ among cylinders. Additional details concerning the engine-compressor 22, including the preferred intake assembly 38, are disclosed in the above-incorporated U.S. patent application entitled ACTIVE AIR CONTROL. While the engine-compressor 22 preferably includes the intake assembly 38, including the air balancing valves, the engine-compressor 22 could have an alternative air intake system without departing from the scope of the present invention.

The turbocharger assembly 24 is operable to discharge compressed intake air to the engine-compressor 22. As will be discussed further, the turbocharger assembly 24 can be adjusted to operate efficiently under off-design conditions. The turbocharger assembly 24 broadly includes a turbocharger housing 54, a turbine rotor 56, an impeller 58, a shaft 60, and an adjustable diffuser vane assembly 62.

Turning to FIGS. 2-5, the turbocharger housing 54 includes a turbine housing 64 and a compressor housing 66. The turbine housing 64 presents a turbine chamber 68, an axial inlet 70, and a radial discharge 72. The compressor housing 66 includes an intermediate section 74, a scroll section 76, an inlet section 78, and a shroud section 80. The intermediate section 74 comprises a substantially circular plate that includes a tapered outer margin 82 and presents an annular groove 84. The scroll section 76 presents open ends 86,88, with the open end 86 of the scroll section 76 being attached to the intermediate section 74 by inserting an outermost lip of the scroll section 76 in the annular groove 84 of the intermediate section 74 (see FIG. 13). The inlet section 78 includes a sleeve 90 and a shaft support 92 integrally attached to the sleeve 90 with struts 94. The inlet section 78 presents opposite ends 96,98 and an inner inlet surface 100 extending between the ends 96,98, with the end 98 presenting a groove 102. The open end 88 receives the inlet section 78, with the inlet section 78 being attached to the scroll section 76 adjacent the end 96.

The shroud section 80 comprises a tapered sleeve including an axially extending sleeve portion 104 and a radially extending sleeve portion 106 that present corresponding shroud ends 108,110 and an inner shroud surface 112 that extends between the ends 108,110 and is operable to conform to the impeller 58 (see FIG. 13). The shroud section 80 also presents air-start ports spaced about the tapered sleeve and fluidly attached to air-start lines L. The radial sleeve portion 106 is substantially flat and presents an annular slot 114 that extends circumferentially along and is recessed from an outer shroud surface. The radial sleeve portion 106 also presents a plurality of holes 116 spaced along the annular slot 114 (see FIG. 6). The axial sleeve portion 106 is substantially cylindrical and presents an O-ring gland 118 adjacent the shroud end 108.

The shroud section 80 is slidably mounted to the inlet section 78 by mounting the shroud end 108 within the groove 102, with the sections 78,80 being substantially coaxial to one another. The O-ring gland 118 receives an O-ring that engages the inlet section 78 so that the inlet section 78 and shroud section 80 cooperatively form a sealed joint that permits relative sliding movement between the sections 78,80. As will be discussed further, the shroud section 80 is supported and operable to be selectively shifted by the diffuser vane assembly 62 along an axial direction aligned with the shroud axis.

The compressor housing 66 presents a compressor chamber 120 that is fluidly separated from the turbine chamber 68 by the intermediate section 74, which is positioned between the chambers 68,120. The compressor chamber 120 includes an inlet portion 122, an impeller portion 124, a diffuser portion 126, and a volute portion 128, with the portions 122,124, 126,128 fluidly interconnecting an inlet and outlet 130,132 of the compressor housing 66 (see FIGS. 2 and 14). The inlet portion 122 is cooperatively formed by the inlet and shroud sections 78,80 of the compressor housing 66. The impeller portion 124 is formed by the intermediate and shroud sections 74,80 and is operable to receive the impeller 58. The diffuser portion 126 is partly formed by the intermediate and shroud sections 74,80 and surrounds the impeller portion 124. The volute portion 128 is cooperatively formed by the intermediate, scroll, and shroud sections 74,76,80. The portions 122, 124,126,128 are fluidly connected to each other in series to permit air flow to be drawn into the inlet 130 by the impeller 58 and discharged as compressed air through the outlet 132.

The shaft 60 presents opposite shaft ends and is rotatably supported by the turbocharger housing 54. In particular, the shaft 60 is rotatably supported by the intermediate section 74 and the shaft support 92 by respective bearings (not shown) and is substantially coaxial to the sections 78,80. Thus, part of the shaft 60 extends into the compressor chamber 120 to support the impeller 58 and another part of the shaft 60 extends into the turbine chamber 68 to support the turbine rotor 56. The turbine rotor 56 is mounted on the shaft 60 and positioned within the turbine chamber 68. In the usual manner, the turbine rotor 56 is rotatable within the turbine chamber 68 and is operable to be powered by engine exhaust to drive the shaft 60.

The impeller 58 is a conventional radial flow impeller and includes a hub 134 and a plurality of impeller vanes 136 uniformly spaced about the hub 134 and attached thereto. The impeller 58 presents an inducer end 138 and an impeller tip 140. The impeller 58 also presents a bore that receives the shaft 60 so that the impeller 58 presents an impeller axis that is coaxial with the shaft 60. Thus, the impeller 58 is mounted on the shaft 60 and positioned within the impeller portion 124 of the compressor chamber 120. In particular, the impeller 58 is positioned with the inducer end 138 adjacent the inlet portion 122 of the chamber 120 and the impeller tip 140 adjacent the diffuser portion 126 of the chamber 120. The impeller vanes 136 and the inner shroud surface 112 cooperatively form channels that extend from the inducer end 138 to the impeller tip 140.

The impeller 58 is rotatable within the compressor chamber 120 and operable to be driven by the shaft 60. The impeller 58 rotates to draw air through the inlet portion 122 and propel air through the channels, through the diffuser portion 126, and into the volute portion 128. The impeller 58 discharges air into the diffuser portion 126 with an absolute velocity identified by the velocity vector V, which is the sum of the air discharge velocity vector relative to the impeller 58 and the tangential velocity of the impeller 58 at the impeller tip 140. It has been found that the direction of the velocity vector V, i.e., the angle between the velocity vector V and the radial direction, changes as engine operating conditions change and as ambient conditions change. In particular, engine parameters, such as engine load or engine speed, and ambient parameters, such as ambient air temperature or pressure, often vary from design conditions used to match the engine and turbocharger into off-design conditions. Therefore, the velocity vector V changes as engine and ambient conditions vary from design conditions and the turbocharger operates less efficiently. Furthermore, conventional turbochargers under off-design conditions have been found to experience a significant reduction in operation range, i.e., the turbocharger compressor provides a narrower range of air flow rates between surge and choked flow conditions.

In the usual manner, the turbocharger assembly 24 is operably coupled to the engine 26 by fluidly connecting the turbine chamber 68 to the exhaust manifold 42, with engine exhaust being directed into the turbine chamber 68 to spin the turbine rotor 56. Furthermore, the outlet 132 of the compressor housing 66 is fluidly connected to the plenum 46 to discharge compressed intake air into the plenum 46 and then into the intake manifolds 48.

While the turbocharger assembly 24 is configured to provide additional intake air flow to the engine 26, the turbocharged engine 20 could include other components for augmenting intake air flow to the engine 26. In particular, a preferred turbocharger boosting system (not shown) can be operably coupled to the turbocharger turbine to increase the amount of heat into the turbine and thereby increase the compressor speed to provide additional intake air flow to the engine 26. The turbocharger boosting system includes a gas burner (not shown) operable to be installed in the exhaust assembly 40, e.g., in the exhaust manifold 42 adjacent the turbine, to add heat to the exhaust gases prior to the exhaust gases reaching the turbine. Additional details of the preferred turbocharger boosting system are disclosed in the above-incorporated U.S. patent application entitled TURBOCHARGER BOOSTER SYSTEM.

Turning to FIGS. 4-14, the adjustable diffuser vane assembly 62 is configured to direct air flow through the diffuser section 86 and improve compressor efficiency under off-design conditions. The diffuser vane assembly 62 broadly includes a plurality of pivotal vanes 142, a vane rotation drive 144, and a vane locking drive 146.

Each pivotal vane 142 includes a body 148 and a pivot pin 150. The body 148 is unitary and elongated and presents leading and trailing edges 152,154 and ends 156,158 (see FIGS. 8 and 14). The body 148 also presents a longitudinal axis extending between the edges 152,154. The body 148 further presents an elongated slot 160 that extends along the end 156 and is substantially aligned with the longitudinal axis. The pivot pin 150 is attached to the end 158 and extends away from the body 148. The pivotal vanes 142 are each pivotally mounted to the intermediate section 74 by inserting the pivot pin 150 into a corresponding hole 162 presented by the intermediate section 74. The vanes 142 are uniformly circumferentially spaced about the impeller axis, with each pair of adjacent vanes 142 presenting a throat that defines a throat width T. The vanes 142 are pivotal between an open throat position where the throat width T is relatively large (see FIG. 8) and a closed throat position where the throat width T is relatively small (see FIG. 9), i.e., the throat width T becomes smaller as the vanes 142 are pivoted into the closed throat position. It is also within the scope of the present invention where the vanes 142 are alternatively mounted within the diffuser portion 126 of the chamber 120. For example, the vanes 142 could be slidably mounted to the intermediate section 74, or the vanes 142 may be mounted entirely to another section of the compressor housing 66.

Figure 8:
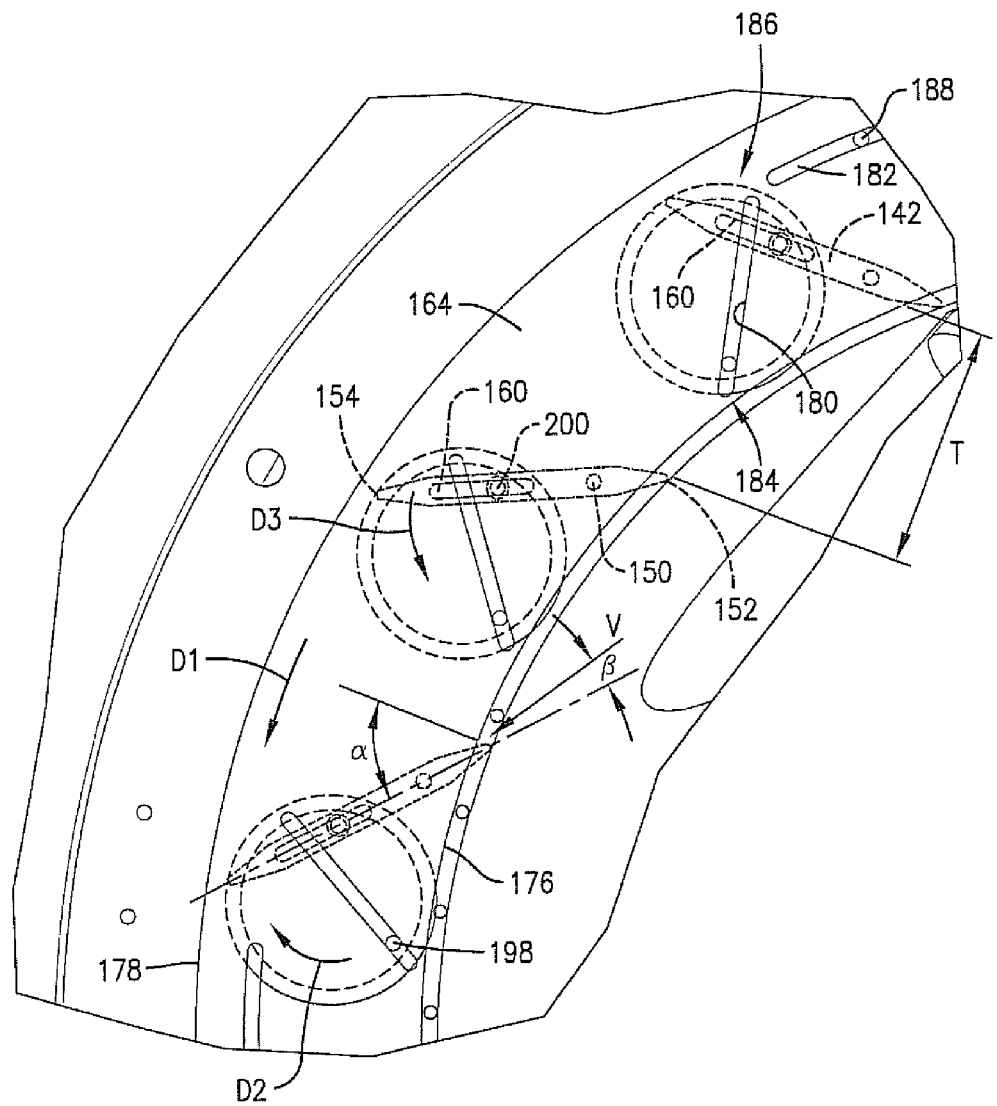
FIG. 8 is an enlarged fragmentary front elevation of the turbocharger shown in FIG. 7, showing the drive ring, cam discs, and diffuser vanes operably interconnected, with the diffuser vanes in the open diffuser throat position.
Figure 9:
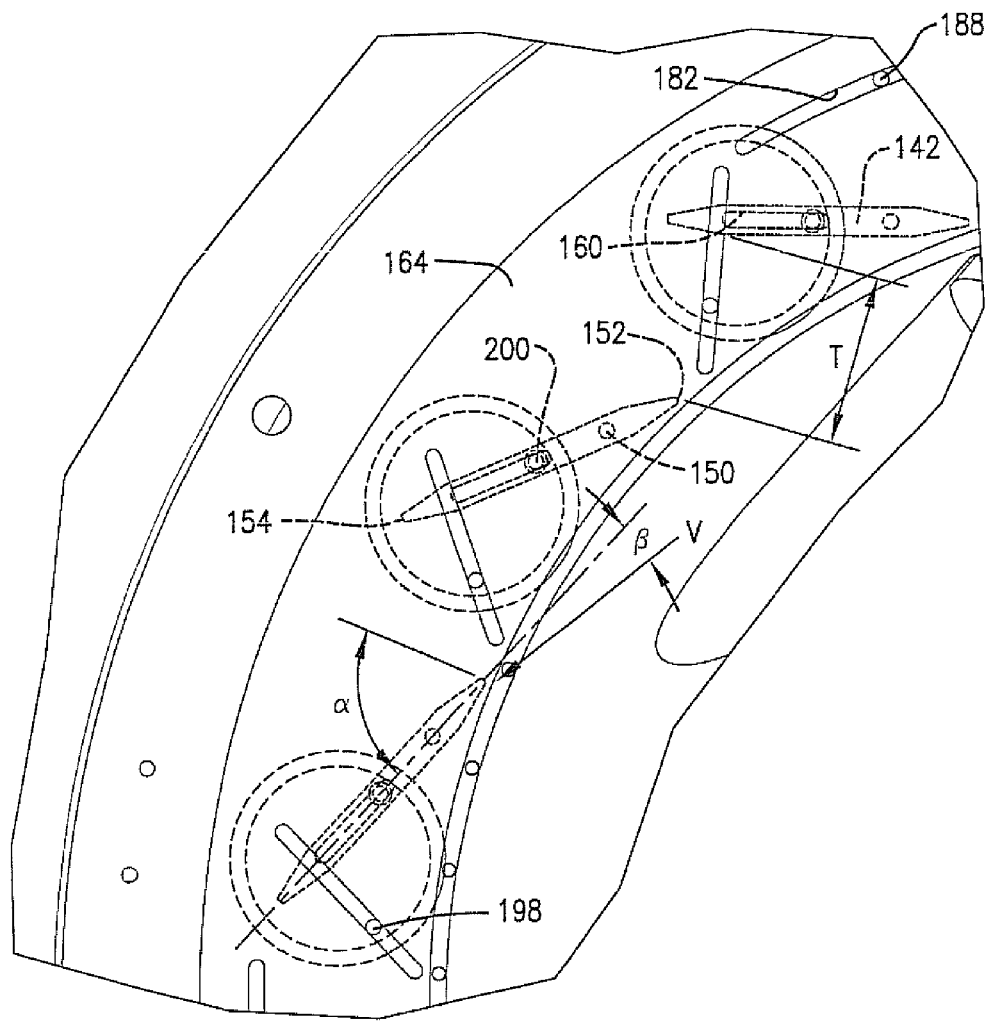
FIG. 9 is an enlarged fragmentary front elevation of the turbocharger shown in FIGS. 7 and 8, showing the drive ring, cam discs, and diffuser vanes operably interconnected, with the diffuser vanes in a closed diffuser throat position.

The pivotal vanes 142 are angled relative to a radial direction extending from the impeller axis to define a vane angle α (see FIGS. 8 and 9). The vanes 142 are operable to pivot through a range of angular positions to efficiently guide intake air through the diffuser portion 126. Furthermore, the vane position can be identified relative to the velocity vector V of the incoming air flow, e.g., by measuring the angle of incidence β (i.e., the angle of attack) between the direction of the velocity vector V and the chord line of the vane 142. For example, the illustrated vanes 142 are shiftable into the open throat position where the angle of incidence β is about +10 degrees (see FIG. 8). The vanes 142 are also shiftable into the closed throat position where the angle of incidence β is about −10 degrees (see FIG. 9). Thus, the illustrated vane 142 pivots through an angle of about 20 degrees between the positions. However, the vanes 142 are operable to pivot beyond these positions without departing from the scope of the present invention.

It has been surprisingly determined through empirical data that the compressor operation range increases significantly relative to a neutral throat position, i.e., where the angle of incidence β is substantially zero, when the vanes 142 are shifted into the closed throat position. At a shaft rotation speed of 13,000 rpm, the range of air flow from surge to choke for the illustrated turbocharger assembly 24 increased by about 50% when the vanes 142 were shifted from the neutral position to the closed position. At a speed of 14,500 rpm, the air flow range increased by about 60%. The closed throat position also resulted in an insignificant increase in pressure drop caused by incidence losses, i.e., the flow loss due to air flow through the vanes 142. It was also determined that operating range decreases significantly when the vanes 142 are shifted from the neutral position into the open throat position, with a slight reduction in pressure drop.

The pivotal vanes 142 are preferably pivotal at the same time to permit uniform vane angle adjustment. While the illustrated diffuser vane assembly 62 preferably includes fifteen (15) pivotal vanes 142 spaced about the impeller 58, a greater or lesser number of vanes 142 could be used without departing from the scope of the present invention.

The vane rotation drive 144 is configured to control pivotal movement of the vanes 142 and includes a drive ring 164, a plurality of cam discs 166, a bracket 168, and an adjustment mechanism 170. The drive ring 164 comprises a substantially flat ring that presents upper and lower ring surfaces 172,174, innermost and outermost edges 176,178, a plurality of cam slots 180, and rotation slots 182. The rotation slots 182 are each arcuate and present a radius defined from an axis of the drive ring 164. The rotation slots 182 are circumferentially spaced about the drive ring axis and positioned along the outermost edge 178 to guide the drive ring 164 during rotation thereof.

Each of the cam slots 180 presents inner and outer slot ends 184,186, with the slot extending in a straight line between the ends 184,186. The cam slots 180 are positioned to present an angle between the cam slot 180 and a radial line extending from the drive ring axis to the slot end 184, with the slots 180 serving as a cam surface. The illustrated drive ring 164 presents fifteen (15) cam slots 180 that are uniformly spaced about the drive ring axis and are configured to be associated with corresponding vanes 142. However, it is also within the scope of the present invention to include an alternative number of cam slots 180.

The drive ring 164 is rotatably received by the annular slot 114 presented by shroud section 80 and is operable to rotate therein. Furthermore, the rotation slots 182 slidably receive stop pins 188 secured to the intermediate section 74, with the stop pins 188 restricting rotation of the drive ring 164 through a predetermined angle of rotation.

The bracket 168 is attached to the drive ring 164 by fasteners and rotates with the drive ring 164. The adjustment mechanism 170 includes a shaft 190, a slotted arm 192 attached to one end of the shaft 190, and a knob 194 attached to the other end of the shaft 190. The adjustment mechanism 170 is rotatably mounted in the scroll section 76, with the slotted arm 192 positioned within the scroll section 76 and slidably attached to a pin of the bracket 168. Therefore, as the shaft 190 rotates the slotted arm 192, the bracket 168 follows the slotted arm 192 and causes the drive ring 164 to rotate about the drive ring axis. While the illustrated adjustment mechanism 170 is driven by a user rotating the knob 194 by hand, the adjustment mechanism 170 could also include a motor that pivots the shaft 190 and the slotted arm 192.

The cam discs 166 each include a disc element 196 and studs 198,200 attached to opposite sides of the disc element 196. The cam discs 166 are rotatably received by corresponding holes 116. Furthermore, each stud 198 is received by a corresponding cam slot 180 when the drive ring 164 is received in the annular slot 114. Thus, as the drive ring 164 rotates about the drive ring axis, the cam slot 180 drives the stud 198 and thereby rotates the corresponding cam disc 166 in the opposite rotational direction. In the illustrated embodiment, the drive ring 164 is rotatable from the open throat position (see FIG. 8) in a counterclockwise direction, indicated by arrow D1, to the closed throat position (see FIG. 9), with the cam discs 166 being driven by the drive ring 164 in a clockwise direction, indicated by arrow D2. Preferably, rotation of the drive ring 164 causes all of the cam discs 166 to rotate at the same time and rotate through the same angle. However, it is within the scope of the present invention where the cam discs 166 are rotated independently of one another.

The shroud section 80 is positioned adjacent the pivotal vanes 142 such that studs 198 of cam discs 166 are preferably slidably received by corresponding slots 160 of the pivotal vanes 142. As the cam discs 166 are rotated by the drive ring 164, the cam discs 166 cause corresponding vanes 142 to pivot in a direction opposite the disc rotation direction. In the illustrated embodiment, the cam discs 166 rotate from the open throat position (see FIG. 8) in the clockwise direction D2, to the closed throat position (see FIG. 9), with the pivotal vanes 142 being driven by the cam discs 166 in a counterclockwise direction, indicated by arrow D3. Consequently, the vanes 142 are all preferably drivingly connected to the drive ring 164 and are configured to be shifted between the open and closed positions simultaneously by the drive ring 164. In this manner, the drive ring 164, cam discs 166, and vanes 142 cooperatively interconnect to define a preferred linkage. It is also within the ambit of the present invention to use an alternative linkage for simultaneously adjusting all of the vanes 142. For instance, a gear train could be used to operably interconnect the vanes 142 to permit simultaneous vane adjustment. The illustrated linkage is configured to adjust the vanes 142 in real time in response to changes in engine operating conditions or changes in ambient conditions.

The vane locking drive 94 serves to selectively hold the pivotal vanes 142 in a desired vane position. It has been found that adjustable vanes often vibrate or otherwise shift during turbocharger operation, and such movement can cause the turbocharger to operate inefficiently or can cause mechanical failure, e.g., where the vane itself fails. The vane locking drive 94 includes a mounting frame 202, a plurality of cylinders 204, and a plurality of compression arms 206. The mounting frame 202 includes ring mounts 208 attached to the scroll section 76 adjacent the inlet 130, a ring-shaped bracket 210 attached to each of the ring mounts 208, and cylinder mounts 212 attached to the ring-shaped bracket 210. The bracket 210 is endless and presents a plurality of annular slots and three transverse cut-outs that each receive a corresponding cylinder mount 212, with a pair of socket-head cap screws securing the cylinder mount 212 to the bracket 210.

The illustrated cylinders 204 are preferably pneumatic cylinders and are actuated by compressed air provided by supply lines (not shown). More preferably, the cylinders 204 are double-acting, 125 millimeter, pneumatic cylinders manufactured by Festo Corporation of Hauppauge, N.Y. The cylinders 204 each include a body 214 and piston 216, with the body 214 being attached to the corresponding cylinder mount 212 so that the piston 216 is shiftable along the impeller axis. Preferably, three cylinders 204 are attached to each cylinder mount 212. However, an alternative number of cylinders 204 could be used without departing from the scope of the present invention. Each group of three cylinders 204 is interconnected by an arm mount 218 that is attached to the piston 216 of each arm mount 218. Thus, each group of cylinders 204 is configured to cooperatively provide uniform axial movement of the arm mount 218 along the impeller axis. Furthermore, a pair of rods 220 slidably interconnect the arm mount 218 and the cylinder mount 212 to restrict off-axis cylinder movement. Furthermore, a pair of springs 222 are slidably mounted on rods 220 and serve to normally force the mounts 212,218 away from each other, e.g., in the event that the cylinders 204 lose air pressure.

The compression arms 206 are elongated with inner and outer ends 224,226. The compression arm 206 also presents a transverse groove 228 spaced between the ends 224,226. The inner end 224 of each arm 206 is attached to the corresponding arm mount 218 and is operable to shift axially with the arm mount 218. The inner and outer ends 224,226 are also attached by fasteners to the shroud section 80 so that the inner and outer ends 224,226 are attached to corresponding locations of the radial sleeve portion 106 of the shroud section 80. Furthermore, the transverse groove 228 permits the compression arm 206 to be spaced apart from the drive ring 164 and thereby permit rotation of the drive ring 164.

The vane locking drive 94 is operable to shift between a locked condition (see FIG. 13) and an unlocked condition (see FIG. 14). In the unlocked condition, all of the pistons 216 are retracted into the cylinder body 214, with the compression arms 206 also retracting the shroud section 80 into an unlocked position spaced apart from the pivotal vanes 142. Consequently, the vanes 142 are generally not restricted from pivotal movement when the vane locking drive 94 is in the unlocked condition.

In the locked condition, the pistons 216 are extended axially away from the cylinder body 214. The extended cylinder position shifts the compression arms 206 and the shroud section 80 so that the shroud section 80 engages the vane ends 156 and the intermediate section 74 engages the vane ends 158 (see FIG. 13). Thus, the shroud section 80 compresses (or "crushes") the vanes 142 against the intermediate section 74 and thereby frictionally engages the vanes 142. In this manner, the vanes 142 are generally restricted from pivotal movement when the vane locking drive 94 is in the locked condition. The vane locking drive 94 preferably holds the vanes 142 in the locked position by the inner shroud surface 112 frictionally engaging the vanes 142. However, it is within the scope of the present invention where a structure other than the shroud section 80 holds the vanes 142 to restrict movement. For instance, the vane locking drive 94 could be configured to axially shift the cam discs 166 to compress the cam discs 166 against the vanes 142 and frictionally hold the vanes 142 between the cam discs 166 and the intermediate section 74.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A variable geometry turbocharger configured to provide compressed air flow, said variable geometry turbocharger comprising:
   a turbocharger housing presenting a compressor chamber with an inlet and a diffuser,
   a rotatable impeller positioned in the compressor chamber; and
   an adjustable diffuser vane assembly including a plurality of diffuser vanes positioned in the diffuser and circumferentially spaced about the impeller, said diffuser vanes being pivotal relative to the impeller to define an adjustable vane angle relative to the impeller,
   said adjustable diffuser vane assembly including a vane-locking drive operably coupled to the diffuser vanes, said vane-locking drive being shiftable into and out of a locked configuration in which the vane-locking drive holds the diffuser vanes to restrict vane angle adjustment,
   said turbocharger housing presenting a turbine chamber,
   said turbocharger housing including first and second housing sections, with the first housing section being positioned between the turbine chamber and the compressor chamber,
   said second housing section being spaced from the first housing section, with the housing sections cooperatively defining at least part of the diffuser,
   said second housing section being shiftably mounted relative to the first housing section and attached to the vane-locking drive to shift into and out of the locked condition along an axial direction,
   said second housing section engaging the diffuser vanes in the locked condition to restrict vane angle adjustment,
   said turbocharger housing including a compressor scroll section,
   said second housing section being shiftably mounted between the scroll section and the first housing section, and operable to slide toward the first housing section into a vane holding position that corresponds to the locked condition, said first and second housing sections engaging the diffuser vanes in the vane holding position.

2. The variable geometry turbocharger as claimed in claim 1, said vane-locking drive including a drive motor mounted to the compressor scroll section, said drive motor attached to the second housing section and configured to shift the second housing section along the axial direction.

3. The variable geometry turbocharger as claimed in claim 2, said drive motor comprising a pneumatic cylinder that includes a cylinder housing mounted to the compressor scroll section and a piston mounted to the second housing section.

4. The variable geometry turbocharger as claimed in claim 1, said vane-locking drive including a spring configured to bias the second housing section into the locked condition.

5. The variable geometry turbocharger as claimed in claim 1, said impeller being rotatable to draw air flow from the inlet and discharge air flow into the diffuser, said second housing section extending from the inlet along the impeller to serve as an impeller shroud.

6. The variable geometry turbocharger as claimed in claim 1, each of said diffuser vanes pivotally attached to the second housing section.

7. The variable geometry turbocharger as claimed in claim 6, said adjustable diffuser vane assembly including a drive ring supported by the second housing section, said drive ring attached relative to the diffuser vanes and configured to adjust the vane angle of the diffuser vanes by rotating relative to the diffuser vanes when the vane-locking drive is out of the locked condition.

8. The variable geometry turbocharger as claimed in claim 7, said adjustable diffuser vane assembly including a plurality of vane rotation elements mounted on the second housing section and each in engagement with and configured to rotate a corresponding diffuser vane and adjust the vane angle.

9. The variable geometry turbocharger as claimed in claim 1, said adjustable diffuser vane assembly including a rotating drive ring supported by at least one of the housing sections, said drive ring attached relative to the diffuser vanes and configured to adjust the vane angle of the diffuser vanes.

10. A variable geometry turbocharger configured to provide compressed air flow, said variable geometry turbocharger comprising:

a turbocharger housing presenting a compressor chamber with an inlet and a diffuser, a rotatable impeller positioned in the compressor chamber; and an adjustable diffuser vane assembly including a plurality of diffuser vanes positioned in the diffuser and circumferentially spaced about the impeller, said diffuser vanes being pivotal relative to the impeller to define an adjustable vane angle relative to the impeller;

said adjustable diffuser vane assembly including a rotating drive ring attached relative to the diffuser vanes and configured to adjust the vane angle of the diffuser vanes, said turbocharger housing presenting a turbine chamber, said turbocharger housing including first and second housing sections, with the first housing section being positioned between the turbine chamber and the compressor chamber, said second housing section being spaced from the first housing section, with the housing sections cooperatively defining at least part of the diffuser, said drive ring supported by the second housing section, said adjustable diffuser vane assembly including a plurality of vane rotation elements mounted on the second housing section and each in engagement with and configured to rotate a corresponding diffuser vane and adjust the vane angle, said vane rotation elements in engagement with the drive ring and configured to be shifted by the drive ring at the same time to adjust the vane angles, said vane rotation elements each including a rotatable disc mounted in the second housing section, with the rotatable disc and the corresponding diffuser vane being interconnected so that the diffuser vane pivots as the disc rotates.

11. The variable geometry turbocharger as claimed in claim 10, said interconnected rotatable disc and diffuser vane being pivotal about respective axes that are offset from one another and being slidably interconnected to cooperatively form a linkage, with an amount of angular disc movement producing a different amount of angular vane movement.

12. The variable geometry turbocharger as claimed in claim 11, said diffuser vane being pivotal through a range of angular movement to vary the compressed air flow.

13. The variable geometry turbocharger as claimed in claim 10, said drive ring and said rotatable discs being slidably interconnected, with pivotal movement of the drive ring causing pivotal movement of the rotatable discs.

14. The variable geometry turbocharger as claimed in claim 13, said drive ring presenting a plurality of circumferentially spaced cam surfaces, said rotatable discs each including a follower portion in sliding engagement with a corresponding cam surface.

15. The variable geometry turbocharger as claimed in claim 10, said rotatable impeller being rotatable to draw air flow from the inlet and discharge air flow into the diffuser, said second housing section extending from the inlet along the impeller to serve as an impeller shroud.

16. A variable geometry turbocharger configured to provide compressed air flow, said variable geometry turbocharger comprising:

a turbocharger housing presenting a compressor chamber with an inlet and a diffuser, a rotatable impeller positioned in the compressor chamber; and an adjustable diffuser vane assembly including a plurality of diffuser vanes positioned in the diffuser and circumferentially spaced about the impeller, said diffuser vanes being pivotal relative to the impeller to define an adjustable vane angle relative to the impeller;

said adjustable diffuser vane assembly including a rotating drive ring supported by the turbocharger housing for rotational movement relative thereto, said adjustable diffuser vane assembly including a plurality of vane rotation elements each shiftably attached to a respective diffuser vane so that shifting movement of the vane rotation elements relative to the respective diffuser vanes causes corresponding pivotal movement of diffuser vanes, said drive ring being in driving engagement with the vane rotation elements to pivot the diffuser vanes as the drive ring is rotated.

17. The variable geometry turbocharger as claimed in claim 16, said turbocharger housing presenting a turbine chamber, said turbocharger housing including first and second housing sections, with the first housing section being positioned between the turbine chamber and the compressor chamber, said second housing section being spaced from the first housing section, with the first and second housing sections cooperatively defining at least part of the diffuser, said drive ring and said vane rotation elements being shiftably supported by the second housing section.

18. The variable geometry turbocharger as claimed in claim 17, said drive ring and said vane rotation elements being slidably interconnected, with pivotal movement of the drive ring causing pivotal movement of the vane rotation elements.

19. The variable geometry turbocharger as claimed in claim 18, said drive ring presenting a plurality of circumferentially spaced cam surfaces, said vane rotation elements each including a follower portion in engagement with a corresponding cam surface.

20. The variable geometry turbocharger as claimed in claim 17, said vane rotation elements each including a rotatable disc mounted in the second housing section, with the rotatable disc and the corresponding diffuser vane being interconnected so that the diffuser vane pivots as the disc rotates.

21. The variable geometry turbocharger as claimed in claim 20, said interconnected rotatable disc and diffuser vane being pivotal about respective axes that are offset from one another and being slidably interconnected to cooperatively form a linkage, with an amount of angular disc movement producing a different amount of angular vane movement.

22. The variable geometry turbocharger as claimed in claim 21, said diffuser vane being pivotal through a range of angular movement to vary the compressed air flow.

23. The variable geometry turbocharger as claimed in claim 20, said drive ring and said rotatable discs being slidably interconnected, with pivotal movement of the drive ring causing pivotal movement of the rotatable discs.

24. The variable geometry turbocharger as claimed in claim 23, said drive ring presenting a plurality of circumferentially spaced cam surfaces, said rotatable discs each including a follower portion in sliding engagement with a corresponding cam surface.

25. The variable geometry turbocharger as claimed in claim 17, said rotatable impeller being rotatable to draw air flow from the inlet and discharge air flow into the diffuser, said second housing section extending from the inlet along the impeller to serve as an impeller shroud.

26. A variable geometry turbocharger configured to provide compressed air flow, said variable geometry turbocharger comprising:

a turbocharger housing presenting a turbine chamber and a compressor chamber with an inlet and a diffuser, said turbocharger housing including first and second housing sections that cooperatively define at least part of the diffuser therebetween, with the first housing section being positioned between the turbine chamber and the compressor chamber;

a rotatable impeller rotatably positioned in the compressor chamber to draw air flow from the inlet and discharge air flow into the diffuser, said second housing section extending from the inlet along the impeller to serve as an impeller shroud; and an adjustable diffuser vane assembly including a plurality of diffuser vanes positioned in the diffuser and circumferentially spaced about the impeller, said diffuser vanes being pivotal relative to the impeller to define an adjustable vane angle relative to the impeller, said adjustable diffuser vane assembly including a rotating drive ring shiftably mounted on the second housing section, said drive ring attached relative to and spaced from the diffuser vanes and configured to adjust the vane angle of the diffuser vanes.

27. The variable geometry turbocharger as claimed in claim 26, said adjustable diffuser vane assembly including a plurality of vane rotation elements each shiftably attached to a respective diffuser vane so that shifting movement of the vane rotation elements relative to the respective diffuser vanes causes corresponding pivotal movement of diffuser vanes, said drive ring being in driving engagement with the vane rotation elements to pivot the diffuser vanes as the drive ring is rotated, said drive ring and said vane rotation elements being shiftably supported by the second housing section.

28. The variable geometry turbocharger as claimed in claim 27, said drive ring and said vane rotation elements being slidably interconnected, with pivotal movement of the drive ring causing pivotal movement of the vane rotation elements.

29. The variable geometry turbocharger as claimed in claim 28, said drive ring presenting a plurality of circumferentially spaced cam surfaces, said vane rotation elements each including a follower portion in engagement with a corresponding cam surface.

30. The variable geometry turbocharger as claimed in claim 27, said vane rotation elements each including a rotatable disc mounted in the second housing section, with the rotatable disc and the corresponding diffuser vane being interconnected so that the diffuser vane pivots as the disc rotates.

31. The variable geometry turbocharger as claimed in claim 30,
    said interconnected rotatable disc and diffuser vane being pivotal about respective axes that are offset from one another and being slidably interconnected to cooperatively form a linkage, with an amount of angular disc movement producing a different amount of angular vane movement.

32. The variable geometry turbocharger as claimed in claim 31,
    said diffuser vane being pivotal through a range of angular movement to vary the compressed air flow.

33. The variable geometry turbocharger as claimed in claim 30,
    said drive ring and said rotatable discs being slidably interconnected, with pivotal movement of the drive ring causing pivotal movement of the rotatable discs.

34. The variable geometry turbocharger as claimed in claim 33,
    said drive ring presenting a plurality of circumferentially spaced cam surfaces,
    said rotatable discs each including a follower portion in sliding engagement with a corresponding cam surface.

* * * * *